March 19, 1935.   H. DEAN   1,994,576
COOKING UTENSIL
Filed Sept. 16, 1933
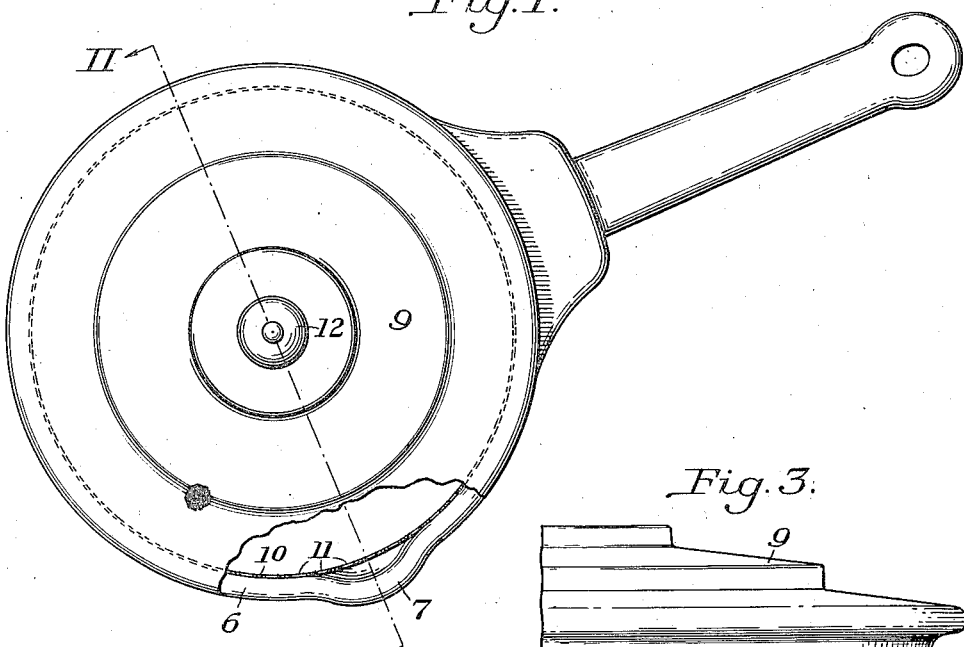
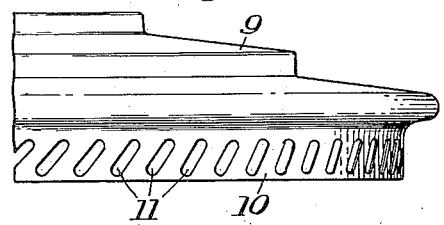
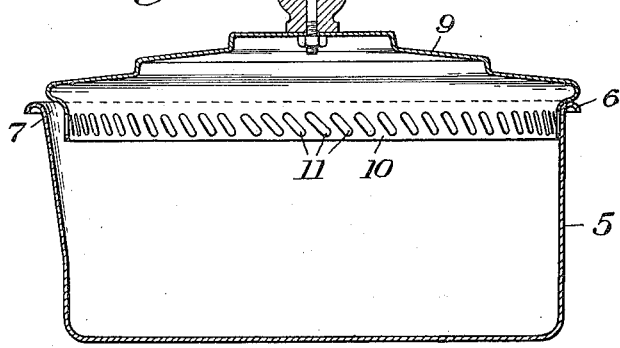
INVENTOR
Herbert Dean
by his attorneys Patented Mar. 19, 1935

1,994,576

UNITED STATES PATENT OFFICE 1,994,576

COOKING UTENSIL

Herbert Dean, Pittsburgh, Pa., assignor to Federal Enameling & Stamping Co., McKees Rocks, Pa., a corporation of Pennsylvania Application September 16, 1933, Serial No. 689,742

2 Claims. (Cl. 53—8)

This invention relates to a receptacle having a cover which facilitates retaining solid material within the receptacle while decanting liquid from the receptacle. More particularly, this invention relates to a cooking utensil having a cover whose peripheral portions strain liquid which is being poured from the utensil.

The drawing is intended merely to illustrate my invention and I do not intend to restrict the same to the embodiment selected for illustration, as the principles of my invention may be applied in various ways. In the drawing which gives one illustrative embodiment, Fig. 1 is a plan view of a cooking utensil with a portion of the cover broken away to illustrate in section the depending foraminous flange, Fig. 2 is a vertical axial section on line II—II of Fig. 1, and Fig. 3 is a fragmentary detail view of the cover in side elevation.

It is frequently desirable to retain solid matter within a receptacle while decanting liquid therefrom. This is particularly true as applied to cooking utensils, since vegetables and the like are frequently boiled in water, the water being poured off when cooking has been completed. With a tight fitting cover the water is decanted but slowly, and the utensil is frequently tilted to such an angle that the confined material tends to dislodge the cover with disagreeable results.

I have provided such a combination of receptacle and cover that the liquid is readily poured off. As is evident from Figs. 1 and 2, the receptacle 5 is formed with a rim 6. Preferably, I provide a pouring lip 7 in the rim, two of these lips being located 180° apart if desired. The cover 9 carries a depending flange 10 which is foraminous, the openings 11 consisting in the preferred embodiment illustrated in the drawing of oblique slots. The depending flange 11 is adapted to telescope with the rim 6 of the receptacle, and constitutes an annular strainer portion.

It will be noted that this strainer portion is adapted to cooperate with the pouring lip 7 in any seated position of the cover 9 on the receptacle. When the receptacle 5 is tilted to pour off the liquid, the solid material such as the vegetables being cooked is retained within the receptacle by the depending flange 10, while the liquid is permitted to pass outwardly and over the pouring lip 7. In the embodiment shown, the depending flange extends substantially parallel to the axis of the cover. It will be understood, however, that if the shape of the receptacle 5 requires it or makes it desirable, the flange 10 may be deflected from parallelism with the axis of the cover. A knob 12 is affixed in conventional manner to the cover 9 for convenience in handling the cover.

Certain advantages of my improved utensil arise from the ability to rapidly remove liquid from the receptacle without removing the cover. Other advantages arise from the telescoping arrangement of the strainer portion of the cover with the rim of the receptacle. This arrangement not only insures that liquid being poured from the receptacle will always be strained, no matter in what relation the cover is seated on the receptacle, but also retains the cover on the receptacle and prevents its sliding off when the receptacle is tilted to pouring position.

While I have illustrated and described one embodiment of my invention, it will be understood that various modifications and changes may be made without departing either from the spirit of the invention or the scope of my broader claims.

I claim:

1. The combination with a substantially circular pan having a pouring lip outwardly offset with respect to the circular contour of the pan, of a cover having a laterally extending flange portion which rests on the top edge of the pan and which leaves the top of the pouring lip open, and an annular vertical flange portion which fits into the pan, the vertical flange portion being spaced from that portion of the wall of the pan which forms the lip, said flange having a continuous series of perforations therearound.

2. The combination with a substantially circular pan having a pouring lip outwardly offset with respect to the circular contour of the pan, of a cover having a laterally extending flange portion which rests on the top edge of the pan and which leaves the top of the pouring lip open, and an annular vertical flange portion which fits into the pan, the vertical flange portion being spaced from that portion of the wall of the pan which forms the lip, said flange having a continuous series of perforations therearound, the perforations being in the form of diagonally elongated slots.

HERBERT DEAN.